Oct. 24, 1939.   L. L. SMALLEY   2,177,501
MEASURING MECHANISM
Filed Nov. 7, 1936   5 Sheets-Sheet 1

INVENTOR.
LEE L. SMALLEY
BY
ATTORNEY.

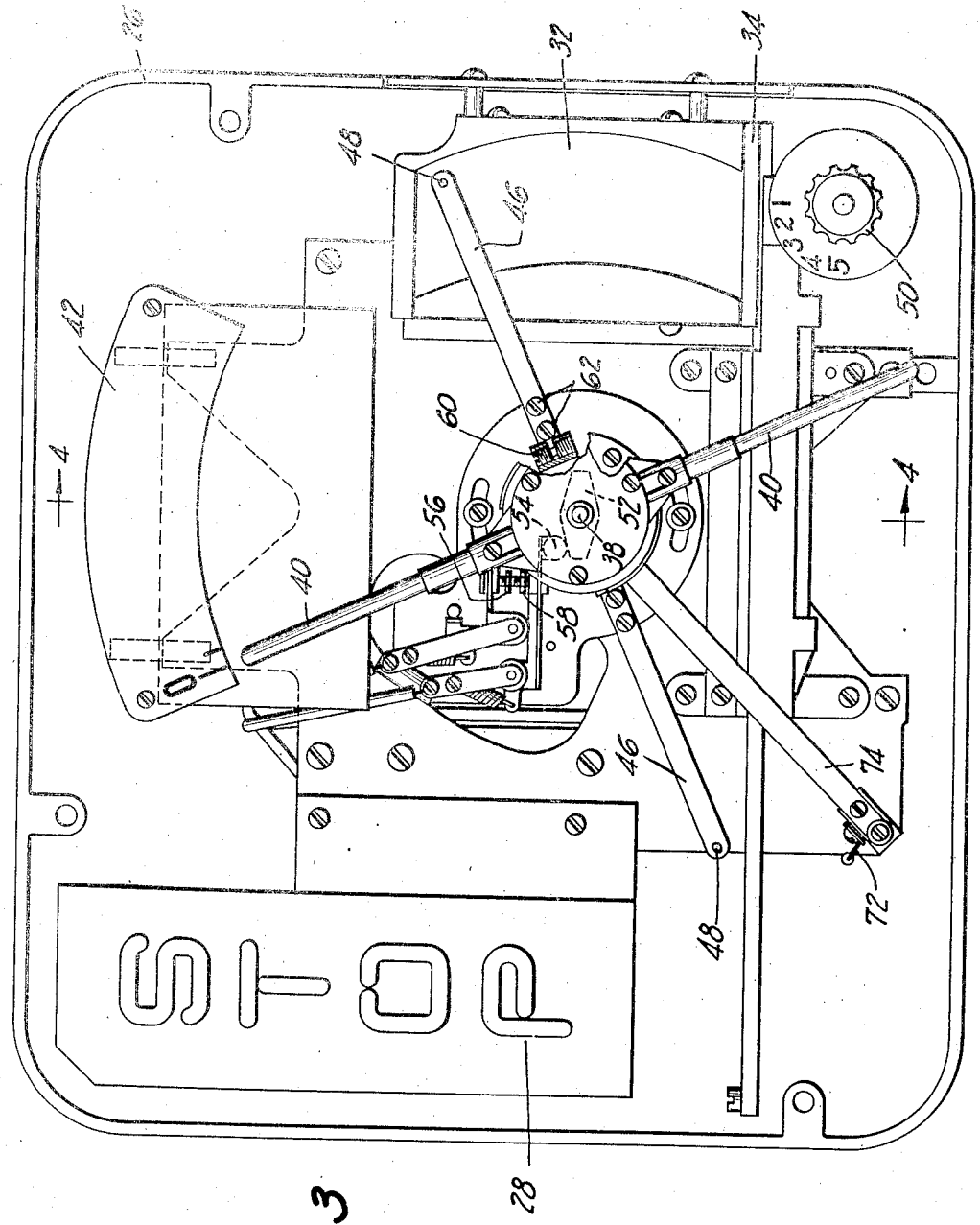

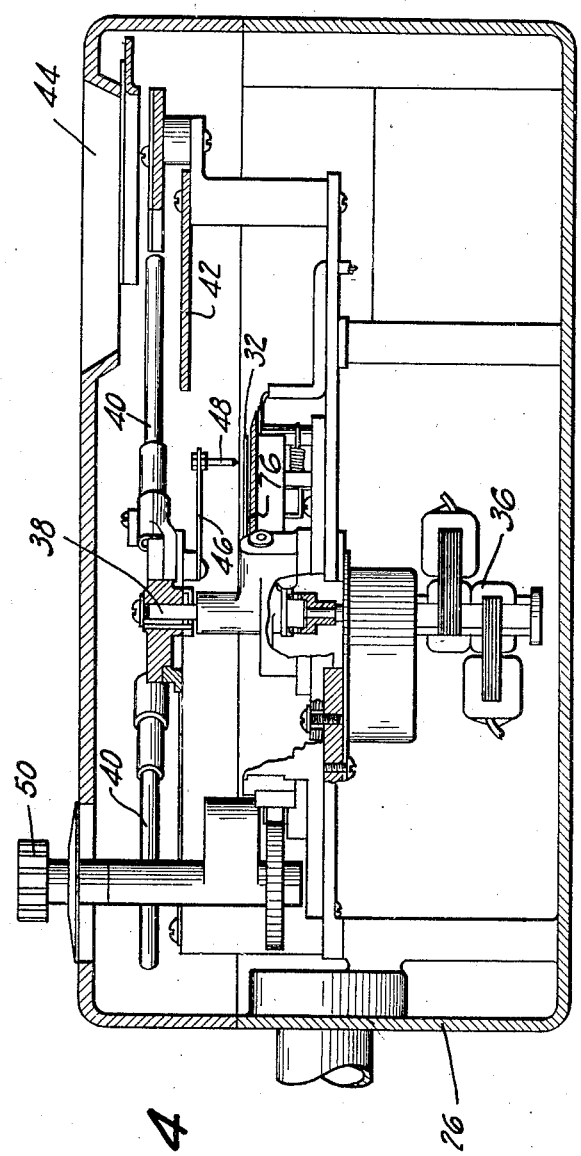

Oct. 24, 1939.  L. L. SMALLEY  2,177,501
MEASURING MECHANISM
Filed Nov. 7, 1936   5 Sheets-Sheet 4

INVENTOR.
LEE L. SMALLEY
BY
A. E. Wilson
ATTORNEY.

Oct. 24, 1939.  L. L. SMALLEY  2,177,501
MEASURING MECHANISM
Filed Nov. 7, 1936   5 Sheets-Sheet 5

INVENTOR
LEE L. SMALLEY
BY A. E. Wilson
ATTORNEY

Patented Oct. 24, 1939

2,177,501

UNITED STATES PATENT OFFICE 2,177,501

MEASURING MECHANISM

Lee L. Smalley, South Bend, Ind., assignor to Bendix Products Corporation, South Bend, Ind., a corporation of Indiana Application November 7, 1936, Serial No. 109,661

13 Claims. (Cl. 35—11)

This invention relates to reaction meters, and more particularly to a reaction meter designed to record the time required by a motor vehicle operator to actuate the controls of the vehicle.

It has been found that due to the physical and mental variations in individuals, a considerable fluctuation in the time required by different individuals to manipulate the control means of vehicles exists. It has been found desirable to make of record the time required to manipulate the controls of motor vehicles or other devices, both as a guide to the operator, and as a matter of public record to enable insurance companies and other interested parties to estimate within a reasonable degree of accuracy the probable facility with which any particular individual will respond to given stimuli.

An object of this invention is therefore to provide means for recording the time required for an individual to respond to a given stimulus.

Another object of the invention is to provide means for making a permanent record of the time required for an individual to perform certain physical acts after a signal has been given.

A further object is to provide means for comparing an individual's mental and physical reaction time with that of any other individual or with the average reaction time of a group of individuals.

Yet a further object of the invention is to provide means for permanently recording the time required for an individual to perform certain acts under various conditions.

A still further object of the invention is to provide means for recording the time required by a vehicle operator to disengage the accelerator, and actuate the brakes.

Another object is to provide a machine having an element driven at a constant speed designed to make a permanent record of the elapsed time from the happening of one event until another event or other events have happened.

A further object of this invention is to provide a machine of simple design which may be manufactured economically to make a permanent record of the reaction time of one individual with reference to another individual or group of individuals.

Other objects and advantages of this invention will be apparent from the following detailed description, considered with the accompanying drawings, submitted for purposes of illustration only, and not intended to define the scope of the invention, reference being had for that purpose to the subjoined claims.

In the drawings, wherein similar reference characters refer to similar parts throughout the several views:

Figure 3 is a front elevation of a portion of the recording mechanism illustrated in Figure 1;

Figure 4 is a view taken substantially on the line 4—4 of Figure 3, looking in the direction of the arrows;

Figure 1:
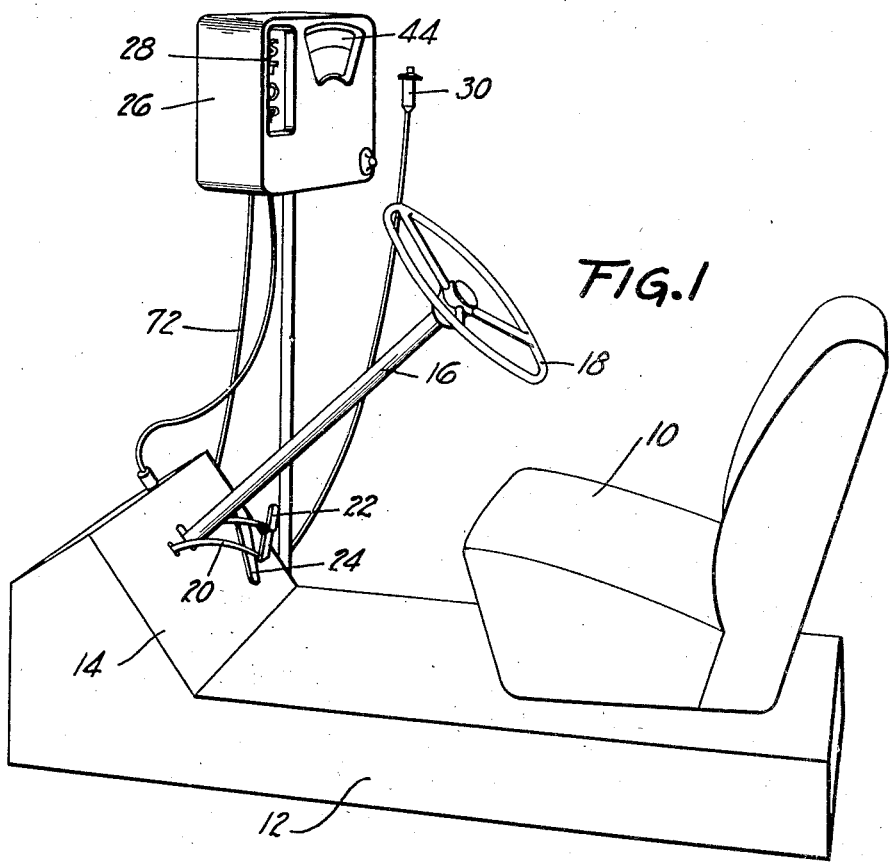
Figure 1 is a perspective view of a device embodying the present invention.

Referring more particularly to Figure 1, there is shown for illustrative purposes one desirable embodiment of the invention. A seat 10 of any desired form is mounted on a base 12, and is preferably adjustable longitudinally and vertically to accommodate individuals of different physical statures. An angularly disposed toe board 14 is carried by the base 12, and is provided with the control members commonly employed in controlling a motor vehicle. A steering column 16 having a wheel 18 fixed thereto projects through the toe board 14, and is provided on opposite sides thereof with clutch and brake pedals 20 and 22 respectively. An accelerator pedal 24 is positioned to the right of the brake pedal as is customary in motor vehicles.

Figure 2:
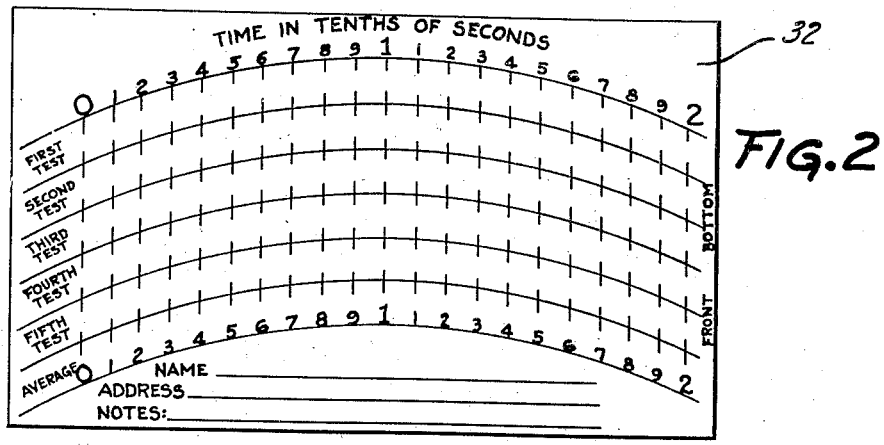
Figure 2 is a plan view of a card on which the results of the reaction test may be permanently recorded.

A reaction meter and recording device is housed in a box 26 of any desired form. A visible or audible signal 28 of any desired form, such as the word "stop" written with neon lights becomes clearly visible to the operator after a control switch 30 located at any desired position has been actuated by the party administering the test. A semaphore which appears and disappears may be the signal, or a whistle or the blast from a whistle. A permanent record of the result of the test may be impressed on a card 32 of the general type illustrated in Figure 2, positioned in a holder 34 in the box 26.

Briefly described, the reaction test is administered in the following manner: The party whose reaction is being checked seats himself in the seat 10, and depresses the accelerator pedal 24. The party administering the test then actuates the switch 30 to start the driving motor 36. When the associated parts reach the so-called zero position the signal 28 becomes energized and illuminated. Simultaneously with the illumination of the signal 28 a recording device positioned at the point marked zero on the card 32 moves across the card 32 at constant velocity. When the operator sees the signal 28 illuminated, he releases the accelerator, and applies the brake as quickly as possible. A permanent record is impressed on the card 32 when the accelerator is released, and another permanent record is impressed on the card when the brake pedal is depressed. It will be understood of course that other permanent records may be impressed on the card if desired to indicate different positions of accelerator pedal release or brake application, or to record the time required to perform other functions than those stated herein.

The recording device, shown more particularly in Figures 3 and 4, is driven by the motor 36, preferably of the synchronous type. The motor 36 drives a shaft 38 at constant speed when the switch 30 is actuated. A pair of diametrically opposed indicating arms 40 are fixed to the shaft 38, and pass over a scale 42 visible through the aperture 44 in the box 26. If desired, the ends of the arms 40 may be illuminated by a neon light when the recording device is actuated to improve the appearance or attractiveness of the device. A pair of diametrically opposed recording arms 46 having contact points 48 are also carried by the shaft 38 and pass over the card 32 positioned in the carrier 34. The card 32 may be moved closer to or further from the shaft 38 by actuating a hand wheel 50 to move the card with reference to the contact point 48 carried by the arm 46.

The shaft 38 is provided with a cam 52 adapted to actuate a follower 54 to close the contact points 56 and 58 to light the "stop" sign and start the indicating and recording arms 40 and 46 in operation. The arms 40 and 46 are so spaced that they pass the zero position on the respective scales at the instant the "stop" signal is illuminated. Means including the screws 60 and 62 are provided to permit slight adjustments to compensate for slight misalinements of the indicating and recording arms.

Figure 6:
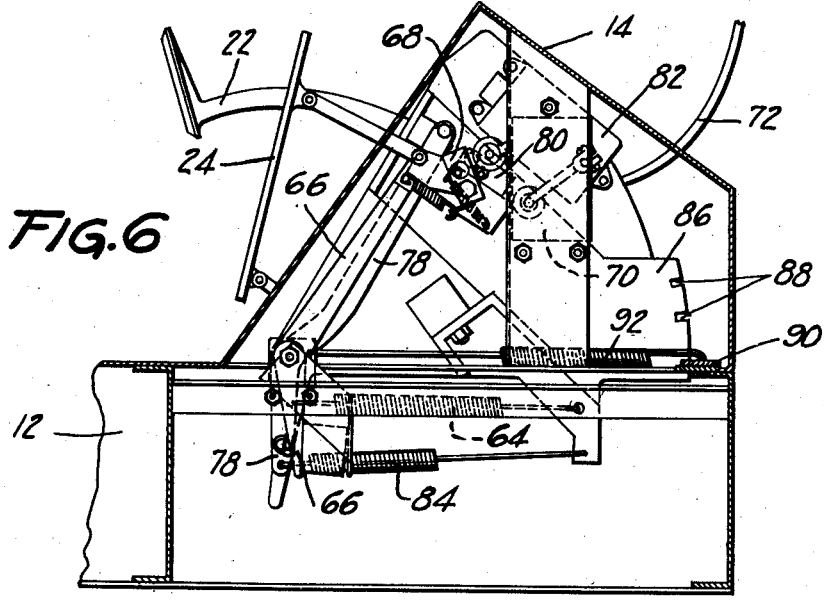
Figure 6 is a side elevation substantially on the line 6—6 of Figure 5.
Figure 5:
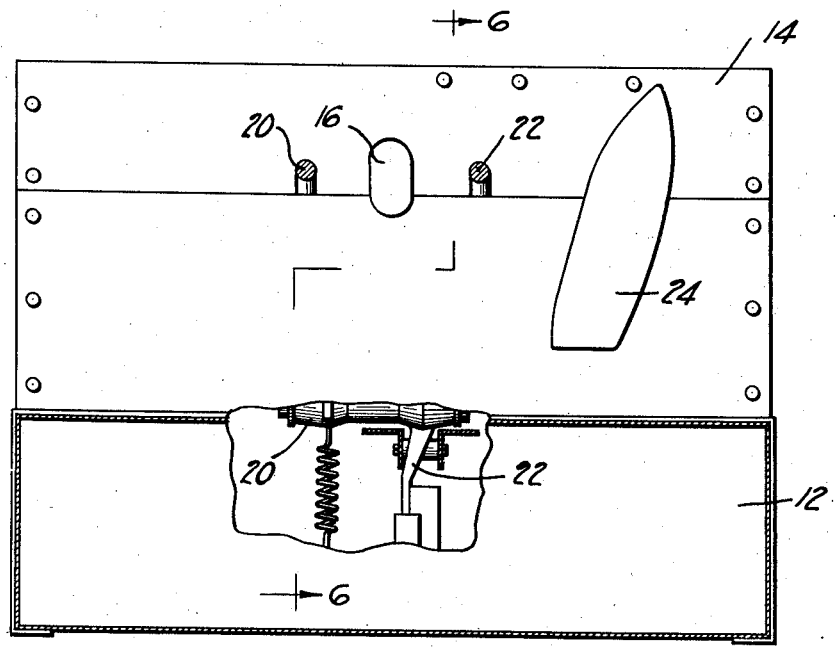
Figure 5 is a plan view, partly in section, of a portion of Figure 1.

The motor 36 rotates the shaft 38 at a constant speed, thereby moving the arms 40 and 46 over their respective scales uniformly. When the operator releases his foot from the accelerator pedal 24 (Figures 5 and 6) the spring 64 operates through the lever 66, latch 68 and operating switch 70 to momentarily energize a high tension wire 72 connected to a bar 74 in the box 26. The high tension current is conducted out the arm 46, and the contact point 48 to impress high tension current across the space between contact point 48 and a contact plate 76, thereby burning a hole through the card 32 at the point where the arm 46 was pointing at the instant the accelerator 24 was released. A neon light in the upper end of the indicating arm 40 may be lighted when the permanent record is impressed on the card if desired.

When the operator has released the accelerator he moves his foot to the brake pedal 22 and depresses it. The brake pedal 22 operates through the lever 78, latch 80 and operating switch 82 to again momentarily energize the high tension wire 72 to impress a permanent record on the card 32 and flash a light in the indicating arm 40. When the brake pedal 22 is released, a spring 84 returns it to the released position.

The effective travel of the brake pedal 22 may be varied to correspond to that of various vehicles by means of the element 86 having a plurality of slots 88 into which a stop member 90 is yieldingly urged by the spring 92.

It will be observed that the particular card 32 illustrated is divided into twenty sections, each of which corresponds to one tenth of a second. The card may, however, be divided into any desired number of sections corresponding to various time intervals to obtain readings of the degree of accuracy desired. Also, the speed of the recording arms or the calibration of the card may be varied to obtain any desired results. The same party may be checked several times on the same card to obtain an average reading, or several parties may be checked on a single card to obtain a comparative reading on the same card.

In the illustrated embodiment, the motor 36 drives the shaft 38 at such a speed that the shaft makes a complete revolution in fifteen seconds. In view of the fact that a plurality of indicating and recording arms 40 and 46 may be employed, it is not necessary to wait for the shaft 38 to make a complete revolution before making the next test since the number of tests made in a given period of time is dependent only on the time required for the indicating and recording arms to reach the zero position on their respective scales.

If desired, the machine can be designed to operate automatically to record several tests when once set in operation by employing a cam or any other desired means to move the card 32 when one test has been completed.

Figure 7:
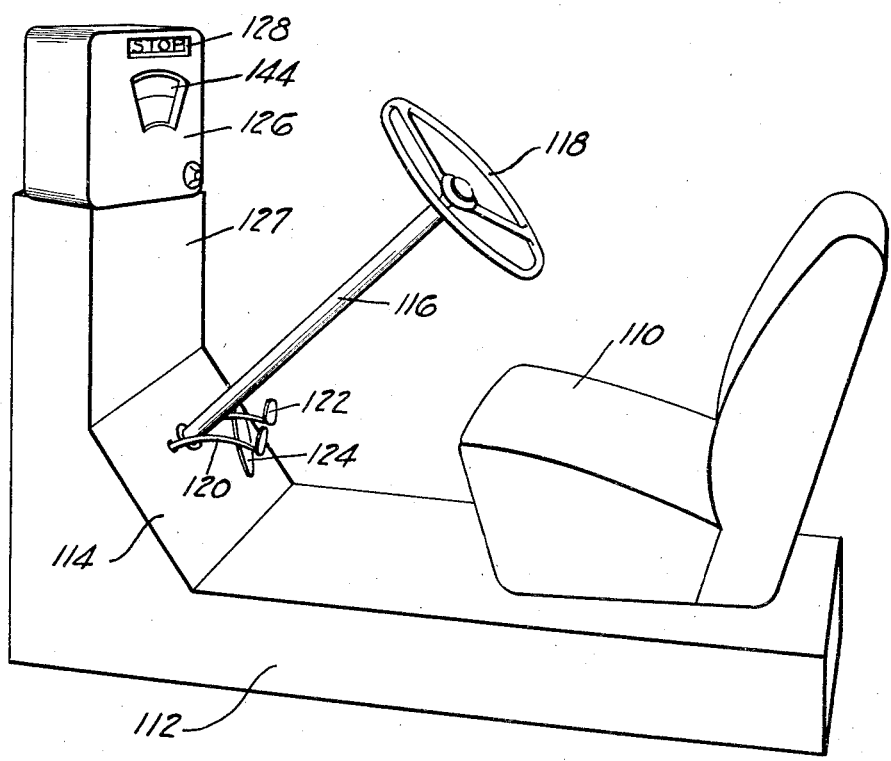
Figure 7 is a view similar to Figure 1, showing a modified form of the invention.

Figure 7 illustrates an embodiment of the invention that is similar in many respects to the embodiment shown in Figure 1. Corresponding parts have therefore been given corresponding reference numerals with the addition of 100.

It will be observed that in this embodiment the box 126 which houses the reaction meter is positioned on a support 127, and that the signal 128 is disposed in such a manner that it appears horizontally as viewed by the party whose reaction is being checked rather than vertically as in the embodiment illustrated in Figure 1. It will be understood that the signal 128 may be carried by the box 126, or may be dissociated therefrom and positioned at any desired distance from the party whose reaction is being checked, and at any desired angle to correspond to that of a traffic signal light as viewed by the operator of a motor vehicle.

While the invention has been described with particular reference to two desirable embodiments, it is to be understood that many changes may be made in the constructional details without departing from the spirit of the invention, as defined by the following claims.

I claim:

1. A reaction meter comprising a signal, means to make the signal effective to call the same to the attention of a person whose reaction is being checked, time indicating means including a scale and a pointer movable over the scale at a uniform speed, means operated by the person, and means to indicate the interval of time between the instant the signal is presented and the instant the means operated by the person is actuated.

2. A reaction testing apparatus comprising means corresponding to acceleration and brake pedals, a signal, means to call the attention of a person being tested to the signal, means operable when the signal is energized to indicate intervals of time, means associated with the first named means to record the interval of time between the calling of attention to the signal and the actuation of said pedals, and means for rendering all of said aforementioned means operative comprising a motor driven driving shaft.

3. In a reaction testing apparatus, physically operable means corresponding to the control means of a motor vehicle, a shaft, means to drive the shaft at constant velocity, a signal, time indicating means driven by the shaft, means also driven by the shaft to present the signal to the person whose reaction is being checked, and means rendered operative by the manually operable means to indicate the elapsed time between the instant when the signal was presented to the person whose reaction is being checked and the physically operable means was actuated.

4. In a reaction testing apparatus, physically operable means corresponding to the control means of a motor vehicle, a shaft, means to drive the shaft at constant velocity, a signal, time indicating and recording means driven by the shaft, switch means operated by the shaft to control the operation of the signal, and means including an electrical circuit and further including a switch operated by the physically operable means to indicate and record the elapsed time between the instant when the signal was energized and the physically operable means was actuated.

5. A reaction testing apparatus comprising physically operable means simultating the accelerator and brake pedals of a motor vehicle, a neon sign, a shaft, means to drive the shaft at constant velocity, a time indicating arm carried by the shaft, a time indicating scale associated with said arm, a time recording arm including a contact point secured thereto, a card having time indicating scales thereon, a switch to start the shaft driving means, means associated with the shaft to simultaneously energize the neon signal and initiate movement of the indicating and recording arms from the zero positions of their respective scales, and means associated with the physically operable means corresponding to the accelerator and brake pedals to impress a mark on the card by passing an electric current through the contact point to indicate the interval of time between the instant when the neon sign was energized and the physically operable means were actuated.

6. A reaction testing apparatus comprising a physically operable pedal, a signal, means for recording the time elapsing between the operation of the signal and the operation of the pedal, said means including a shaft, power means for rotating the shaft, an arm secured to the shaft, recording means so positioned as to be passed over by the arm during the rotation of the shaft, and power means operated by the pedal for rendering the recording means operative, together with power means also operated by the shaft for rendering the signal operative.

7. A reaction testing apparatus for determining the elapsed time between the flashing of a signal and the release of a pedal simulating the accelerator pedal of an automotive vehicle comprising a signal, a physically operable pedal, a recording chart, means for marking said chart, power means for operating said marking means including a driving motor and a rotatable shaft driven by said motor, other power means operated by said shaft for rendering the signal operative, and power means operated by the pedal for rendering the marking means operative to mark the chart.

8. A reaction testing apparatus for testing the time required by a person to release the accelerator of an automotive vehicle and apply the brakes comprising an accelerator simulating pedal, a brake simulating pedal, a signal, means for calling the signal to the attention of the person being tested, means for indicating the time elapsed after the operation of the first mentioned means, means for recording the time elapsed between the operation of the first mentioned means and the release of the accelerator simulating pedal and for recording the time elapsed between the operation of the first mentioned means and the application of the brake simulating pedal, and a control member arranged to be operated by some person other than the person being tested to control the operation of the first mentioned means as well as the initiation of the action of the time elapsed indicating means.

9. A reaction testing apparatus for testing the time required by a person to apply the brakes of an automotive vehicle comprising a brake simulating pedal, a signal, means for calling the signal to the attention of the person being tested, means for recording the time elapsed between the operation of the first mentioned means and the application of the brake simulating pedal, and a control member arranged to be operated by some person other than the person being tested to control the operation of the first mentioned means as well as the initiation of the action of the time elapsed recording means.

10. A reaction testing apparatus for testing the time required by a person to release the accelerator of an automotive vehicle and apply the brakes comprising an accelerator simulating pedal, a brake simulating pedal, a signal, means for calling the signal to the attention of the person being tested, means for indicating the time elapsed after the operation of the first mentioned means, means for recording the time elapsed between the operation of the first mentioned means and the release of the accelerator simulating pedal and for recording the time elapsed between the operation of the first mentioned means and the application of the brake simulating pedal, and a control member arranged to be operated by some person other than the person being tested to control the operation of the first mentioned means as well as the initiation of the action of the time elapsed indicating means, said means for indicating the lapse of time comprising a rotating shaft and an arm connected to said shaft, said shaft also carrying a cam arranged to operate an electric switch for energizing the first mentioned means and carrying another arm which is comprised in the recording means.

11. A reaction testing apparatus for testing the time required by a person to apply the brakes of an automotive vehicle comprising a brake simulating pedal, a signal, means for calling the signal to the attention of the person being tested, and means for recording the time elapsed between the operation of the first mentioned means and the application of the brake simulating pedal, recording means, said means for calling the attention of the person tested to the signal comprising a rotating shaft carrying a cam arranged to operate an electric switch for energizing the first mentioned means and carrying an arm which is comprised in the recording means.

12. A reaction testing apparatus for testing the time required by a person to release the accelerator of an automotive vehicle and apply the brakes comprising an accelerator simulating pedal, a brake simulating pedal, a signal, means for calling the signal to the attention of the person being tested, means for indicating the time elapsed after the operation of the first mentioned means, means for recording the time elapsed between the operation of the first mentioned means and the release of the accelerator simulating pedal and for recording the time elapsed between the operation of the first mentioned means and the application of the brake simulating pedal, and a control member arranged to be operated by some person other than the person being tested to control the operation of the first mentioned means as well as the initiation of the action of the time elapsed indicating means, said means for indicating the lapse of time comprising a rotating shaft and an arm connected to said shaft, said shaft also carrying a cam arranged to operate an electric switch for energizing the first mentioned means and carrying another arm which is comprised in the recording means, said recording means including a chart over which said last mentioned arm passes, a contact point on said arm through which an electric current is adapted to pass so as to mark said chart, and including means to shift said chart so as to provide space for additional tests.

13. A reaction testing apparatus for testing the time required by a person to react comprising an accelerator simulating pedal, a brake simulating pedal, a signal, means for calling the signal to the attention of the person being tested, a reaction lever to be operated by the person being tested, means for recording the time elapsed between the operation of the first mentioned means and the operation of the reaction lever, said means for recording the lapse of time comprising a rotating shaft and an arm connected to said shaft, said shaft also carrying a cam arranged to operate an electric switch for energizing the first mentioned means and also including a chart over which said arm passes, a contact point on said arm through which an electric current is adapted to pass so as to mark said chart, and including means to shift said chart so as to provide space for additional tests.

LEE L. SMALLEY.